United States Patent [19]

Weimer et al.

[11] 4,433,001

[45] Feb. 21, 1984

[54] METHOD FOR PREPARING SCRAMBLED EGGS

[75] Inventors: Ralph E. Weimer, Lombard; Thaddeus J. Kalowski, Lisle; Robert A. Novy, LaGrange Park, all of Ill.

[73] Assignee: Restaurant Technology, Inc., Ill.

[21] Appl. No.: 355,687

[22] Filed: Mar. 8, 1982

[51] Int. Cl.$^3$ ............................................... A23L 1/32
[52] U.S. Cl. ..................................... 426/614; 426/523
[58] Field of Search .................. 426/614, 523; 99/348, 99/426, 448

[56] References Cited

U.S. PATENT DOCUMENTS

| | | | |
|---|---|---|---|
| D. 162,041 | 2/1951 | Klein | 99/426 X |
| 3,624,230 | 11/1971 | Robinson, Jr. | 426/614 |
| 4,120,981 | 10/1978 | Burkhart | 426/614 X |
| 4,203,357 | 5/1980 | Vaussanvin | 99/348 X |
| 4,228,193 | 10/1980 | Schindler et al. | 426/614 X |
| 4,345,516 | 8/1982 | Sinclair | 99/426 |

Primary Examiner—Robert A. Yoncoskie
Attorney, Agent, or Firm—Dressler, Goldsmith, Shore, Sutker & Milnamow, Ltd.

[57] ABSTRACT

A method for preparing scrambled eggs on a grill surface, wherein liquid scrambled eggs mix are placed within an egg ring having a lower edge portion in intimate contact with a heated grill surface and the egg ring is moved repeatedly to and fro, preferably in a reciprocating motion, while maintaining the lower edge portion of the egg ring in intimate contact with the grill surface. The egg mix is rapidly moved within the confines of the egg ring, and that rapid movement is continued until the egg mix has congealed into a mass of cooked scrambled egg. Desirably a carriage mounts a plurality of egg rings, and each mounts a comb-like member which engages, moves, and mixes the eggs in the egg ring as the egg ring moves to and fro. The to and fro movement is such that it produces a wave-like motion of the liquid eggs during a first portion of the cycle of rapid movement of the eggs.

9 Claims, 9 Drawing Figures

U.S. Patent Feb. 21, 1984 Sheet 1 of 3 4,433,001
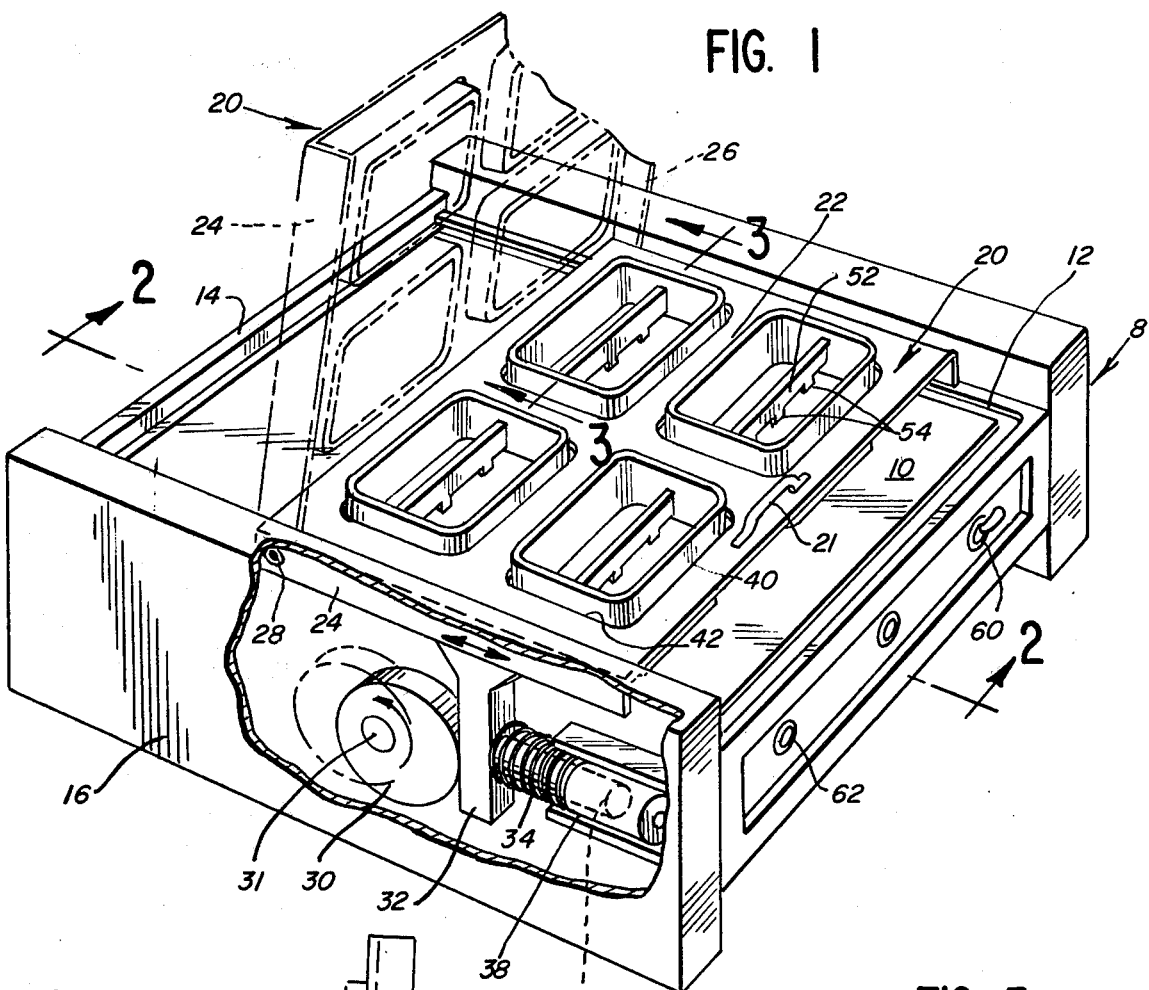
FIG. 1
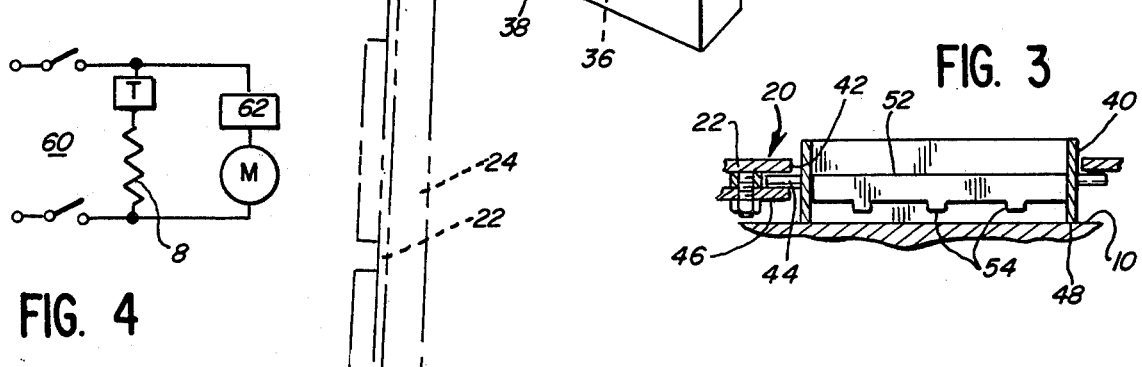
FIG. 3
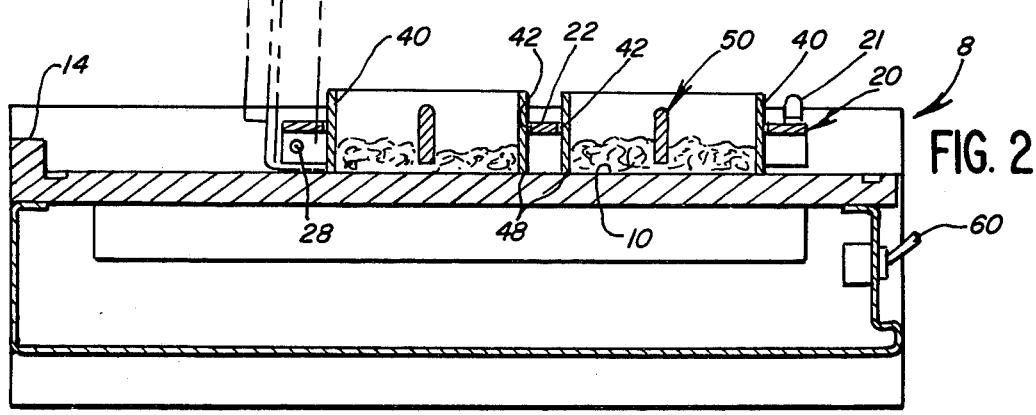
FIG. 4
FIG. 2

METHOD FOR PREPARING SCRAMBLED EGGS

BACKGROUND OF THE INVENTION

This invention relates to an improved method and apparatus for producing light, fluffy, delectable scrambled eggs.

Scrambled eggs are conventionally batch-made in relatively small quantities. For institutional and high volume restaurant operations scrambled eggs are usually made on a hot grill surface. In high volume operations it is frequently deemed necessary to prepare large batches in advance, from which service is made of portions, sometimes one-half hour or more after they are made. Of course, scrambled eggs fresh off the grill taste much better than those which are held for extended periods of time.

In accordance with the present invention the preparation of multiple, service-size portions of scrambled eggs on a grill surface, hence with the conventional taste, texture and consistency of freshly prepared scrambled eggs, is provided for, and with the speed necessary for high volume restaurant operations. This may be done without jeopardizing quality, and the process and apparatus produced scrambled eggs which are consistent from batch to batch, all in a very compact space.

As such, the method and apparatus of the present invention is an improvement over the conventional method of cooking scrambled eggs on a grill, as well as over other processes, such as that described in U.S. Pat. No. 4,228,193.

BRIEF SUMMARY OF THE INVENTION

The method and apparatus of this invention permit and provide for the rapid and consistent preparation of individual, serving-sized portions of scrambled eggs which are moist, fluffy and delectable, and which are substantially indistinguishable from conventionally grill-prepared scrambled eggs. This is done in an area in plan view which is very compact and in multiple, individual portions automatically and consistently, thereby permitting the rapid service of customers with freshly scrambled eggs, all with a minimum of human intervention in the egg cooking process.

To that end, the invention of this application comprises a method of preparing scrambled eggs, including the steps of placing liquid eggs to be scrambled within an egg ring having a lower edge portion in intimate contact with a heated grill surface, rapidly moving the egg ring to and fro while maintaining the lower edge portion in intimate contact with the grill surface, thereby to rapidly move said eggs within the confines of the egg ring, and continuing that rapid movement until said eggs have congealed into a mass of cooked scrambled egg. Desirably the eggs are premixed and disposed in the egg ring as a liquid mix to be scrambled. Preferably the to and fro movement is reciprocating movement, and there is a plurality of egg rings, each provided with egg mix for the preparation of an individual, serving-sized portion of scrambled eggs. It is preferred that each egg ring mount an interceptor comb-like member, the lower edge of which is adjacent and above the grill surface, whereby the interceptor member, and preferably the downwardly extending teeth of the comb, engages, moves and mixes the egg mix as the egg ring moves to and fro. The to and fro movement is such that it produces a wave-like motion of the liquid egg mix during a first portion of the cycle of rapid movement.

In the preferred embodiment the egg ring used in the process and apparatus is generally rectangular and the to and fro movement is at a first rate for a first portion of the cycle of rapid movement, during which the egg mix is primarily liquid, and at a faster rate for a second portion of the cycle of rapid movement, during which the egg mix is at least partially congealed.

The apparatus of the present invention is adapted for use in carrying out the method described. As such, the apparatus comprises a grill having a grill surface and means for heating the grill surface. The grill is mounted on a frame. The frame mounts a carriage which supports a plurality of egg rings. Each egg ring has a lower edge portion adapted to be disposed in intimate contact with the grill surface and for movement therealong, thereby to define with the grill surface an enclosed region within the egg ring. Motor means on the frame is operatively connected to the carriage for rapidly moving the carriage and the egg ring to and fro along the grill surface, all so that egg mix placed in the egg rings on the grill is adapted to be confined in the egg rings and to be moved to and fro and cooked on the grill surface.

Preferably the motor means comprises means for reciprocating the carriage and the egg ring along the grill surface. Desirably each egg ring mounts a comb-like interceptor member extending across the egg ring, the lower edge of the interceptor member being adjacent and above the grill surface and at an elevation to intercept egg mix as the egg ring moves to and fro.

The motor means preferably includes means for automatically reciprocating the carriage and associated egg rings at a first rate for a first portion of the cycle of rapid movement and at a faster rate during a second portion of the cycle of rapid movement.

BRIEF DESCRIPTION OF THE DRAWINGS

Further objects, features and advantages of the present invention will become apparent from the following description and drawings, of which:

FIG. 1 is a perspective view of a first embodiment of an apparatus of the present invention for producing scrambled eggs;

FIG. 2 is a sectional view taken substantially along line 2—2 of FIG. 1;

FIG. 3 is a fragmentary cross-sectional view taken substantially along line 3—3 of FIG. 1;

FIG. 4 is a fragmentary, schematic circuit diagram;

BRIEF DESCRIPTION OF THE ILLUSTRATIVE EMBODIMENTS

Figure 5:
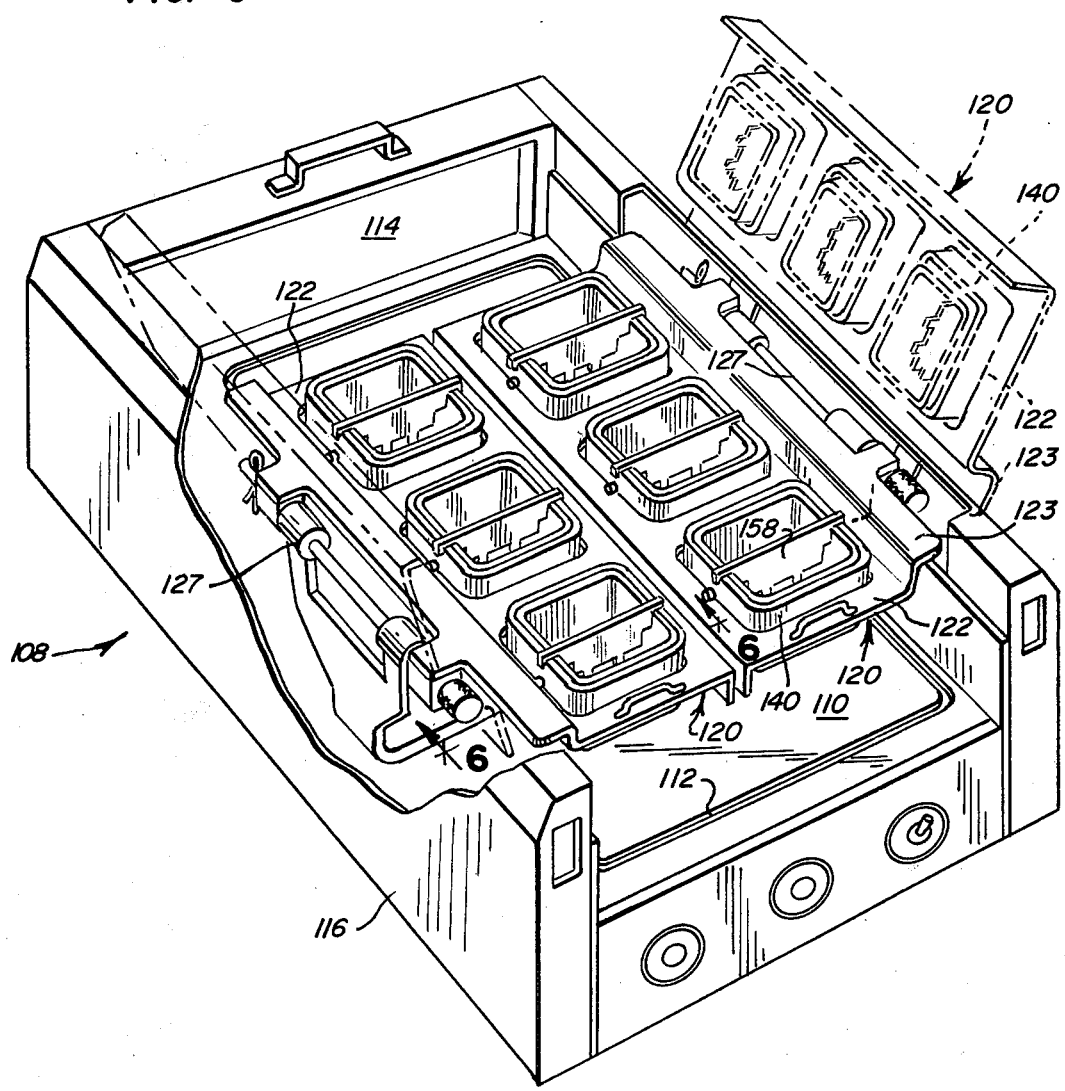
FIG. 5 is a perspective view of a second embodiment of an apparatus of the present invention.

Referring first to FIGS. 1 and 2, an apparatus of the present invention comprises a grill assembly comprising a grill 8 having a grill surface 10. Desirably the grill surface 10 is a nickel-coated and surface-hardened. The nickel coating may be applied by an Electroless process. The grill surface may be provided with a peripheral trough 12 for collecting grease and debris and a splash guard 14 which may be used to facilitate the removal of grill scrapings and the like. The grill surface 10 may be electrically or gas heated in a conventional manner.

Grill 8 is suitably mounted and supported on a frame assembly 16 which also suitably serves to house controls, motors and other such elements to be described.

Frame assembly 16 also mounts a carriage 20 mounted for to and fro movement. Carriage 20 comprises a sheet metal form having a central web 22 and lateral flanges 24 and 26. At its rearward edge flange 24 is provided with a suitable bushing for pivotally securing it to a pivot rod 28. As such, carriage 20 may be disposed in the full line position shown in FIG. 1, and may also be tilted upwardly rearwardly to the dotted line position shown in FIG. 1.

Carriage 20 is adapted to be reciprocated by a suitable reciprocating mechanism which, as shown in FIG. 1, may comprise an eccentric motor driven cam 30, a vertical rod extension 32 which is secured to the flange 24 against which cam 30 acts, a compression spring 34, a guide rod 36 and a guide tube 38. Thus, as cam 30 rotates about cam shaft 31, rod extension 32 is moved to and fro against spring 34. Guide rod 36 moves in guide tube 32 to guide the carriage 20 and to stabilize it in its to and fro reciprocating movement. Desirably the flange 26 is also provided with a guide assembly, such as a guide rod and guide tube, to stabilize movement. It is not necessary, depending upon the strength of the components, to provide a motor driven cam or other complementary drive means at the other side of the carriage 20. However, it is clear that a suitable bushing for pivotally mounting the flange 26 to the guide assembly at the other side of the carriage will also be provided.

The central web 22 of carriage 20 defines a plurality of openings to receive egg rings 40. Each egg ring 40 is generally rectangular and, in the preferred embodiment, each ring 40 is about four inches square in plan view with about a one-half inch radius at each corner. Each ring is about 2½ inches high. Each egg ring floats slightly in an opening 42 in the web 22. Each opening is slightly larger than the egg ring to permit slight relative movement. Each egg ring, at its sides, is provided with a pin 44 which is received in a mounting block 46 secured to the carriage 20. The opening in the block receiving the pin is proportioned so that the ring may oscillate about the pins and may move vertically slightly, thereby to accommodate to manufacturing tolerances and slight inconsistencies in dimension, all so that the lower edge portion 48 of each egg ring may be maintained in intimate contact with the grill surface 10 in use.

Desirably the egg ring is of a non-stick, temperature resistant, dimensionally stable plastic material, such as Teflon or Delrin. Alternatively, the ring may be of metal, such as stainless steel coated with a non-stick surfacing. When a heat conductive central core material, such as metal, is used for the egg ring, some sticking will tend to occur even if a non-stick surfacing is used.

Each egg ring 40 also mounts an interceptor member or means which desirably is comb-like in configuration. Comb member 50 comprises a base 52 from which downwardly extending teeth 54 extend. The teeth 54 extend downwardly to an elevation above the grill surface 10. In one embodiment, each comb member 50 has three teeth. In side elevation the base of the comb member is about one-half inch high, the teeth are about three-eighths inch long and one-eighth inch wide. The teeth are spaced on about one inch centers and the lower edge of the teeth terminate adjacent the grill surface, about one-half inch thereabove.

The carriage 20 and egg rings 40 are adapted to move in a rapid to and fro reciprocating motion so that egg mix disposed within the egg rings 40 may be rapidly moved on the heated grill surface 10. To that end, electrical controls and a motor and motor controls are provided, and these include an on-off switch 60, a cooking cycle switch 62 which includes a circuit including an automatic timing switch responsive to the cooking cycle switch, a motor M and a conventional thermostatic control means for grill surface temperature control.

The carriage 20 is adapted to be moved, as with a suitable handle 21, from the full line operational position of FIGS. 1 and 2 to the dotted-line position of FIGS. 1 and 2 in which removal of the scrambled eggs and cleaning of the grill surface is facilitated.

In accordance with the present invention, liquid scrambled egg mix is adapted to be rapidly scrambled on the grill surface. To this end two eggs may be thoroughly pre-mixed with or without whatever condiments and additives may be desired for each egg cup. Alternatively the eggs may be disposed in the egg cup directly and may be mixed during operation of the scrambler. The grill is suitably buttered or greased (as may be the insides of the egg rings), and the carriage 20 is moved to the operational position. Two mixed eggs are then disposed in each of one or more of the egg rings, depending upon how many orders of scrambled eggs are desired at the time. The cooking cycle switch 62 is then actuated, and the carriage begins to move in its reciprocating to and fro motion.

At a grill temperature of about 265° F., the preferred reciprocation (to and fro movement) is at an initial rate of about 50 strokes per minute. Each stroke is about five inches. The first portion of the 25 second cooking cycle, during which the egg mix is primarily liquid, lasts for about ten seconds at the 50 stroke per minute rate. During the initial period the liquid egg mix begins to congeal and by the conclusion of the ten second initial portion of the cycle, the egg mix has lost most of its liquid characteristics. Also, during the initial portion of the cycle especially, the rapid reciprocating movement produces a wave motion in the mix so that the appearance of the egg mix is one of waves moving to and fro in the direction of reciprocation.

After about ten seconds, the motor is automatically caused to increase the rate at which it reciprocates the carriage from about 50 strokes per minute to about 100 strokes per minute. That is continued for about 15 seconds, at which time, under the conditions indicated, the cooking of the egg mix is completed and the egg mix in each ring has congealed into a mass of scrambled eggs of a fluffy, suitably moist and delectable character. The carriage may then be moved to its dotted line position and the eggs removed from the grill and the grill cleaned.

During the second more rapid portion of the cooking cycle, the eggs continue to congeal. So that they are moved and mixed appropriately, the interceptor or comb member, and particularly the teeth, act to engage, move and mix the egg mass, to tip over the mass and to mix the mass as the egg rings move to and fro.

The egg rings are configured so that the lower edge portion 48 of each egg ring 40 is maintained in intimate contact with the grill surface 10 during the cooking cycle thereby to provide an enclosed region within the egg ring and to rapidly move the egg mix within the confines of the egg ring during the cooking cycle. This is accomplished both by appropriate machining of the lower surfaces 48 and by appropriate biasing of the carriage 20 against the egg rings 40, hence against grill surface 10. However, a balance must be maintained so that undue wear of the grill surface and egg rings is avoided. Therefore, it is possible for some egg mix to escape the confines of the egg rings during the cooking cycle, although this should be maintained at a practical minimum consistent with the indicated parameters.

Referring now to the embodiment of FIG. 5, a grill assembly 108 is provided with a grill surface 110 having a suitable trough 112 and splash guard 114. Grill assembly 108 is mounted on a frame assembly 116.

Figure 6:
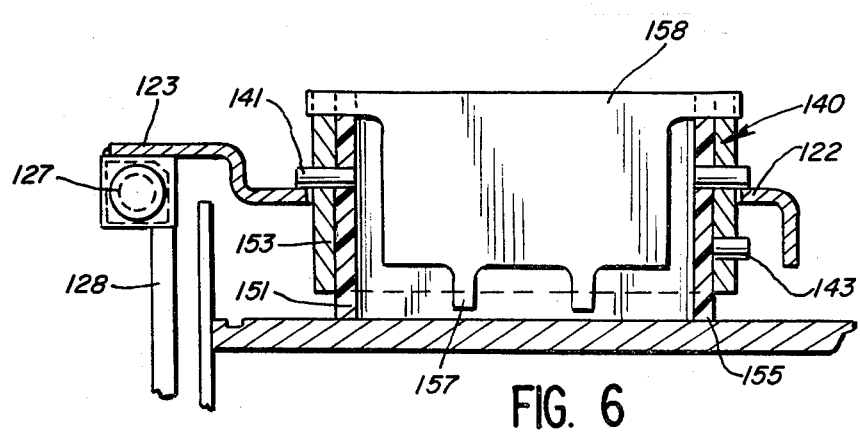
FIG. 6 is a fragmentary cross-sectional view of a portion of the apparatus of FIG. 5.
Figure 7:
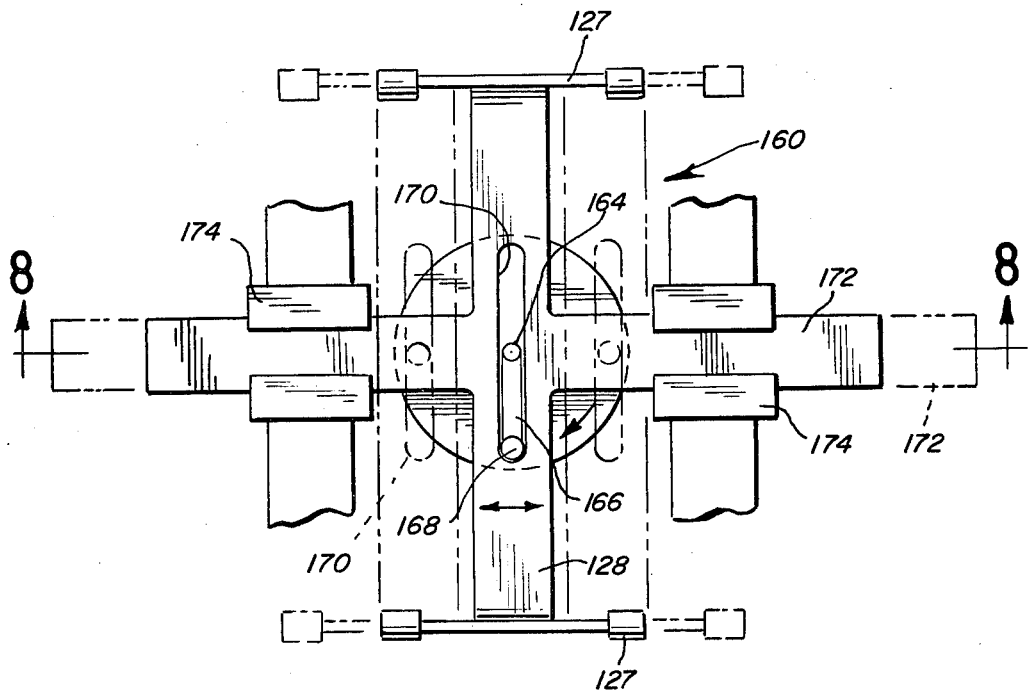
FIG. 7 is a fragmentary plan view of the drive mechanism of the apparatus of FIG. 5.
Figure 8:
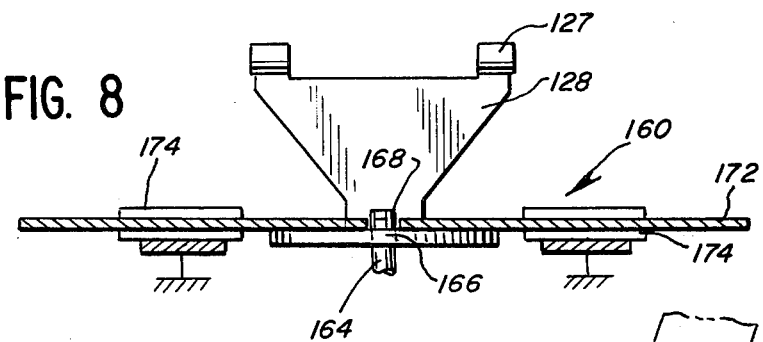
FIG. 8 is a fragmentary cross-sectional view taken substantially along line 8—8 of FIG. 7.
Figure 9:
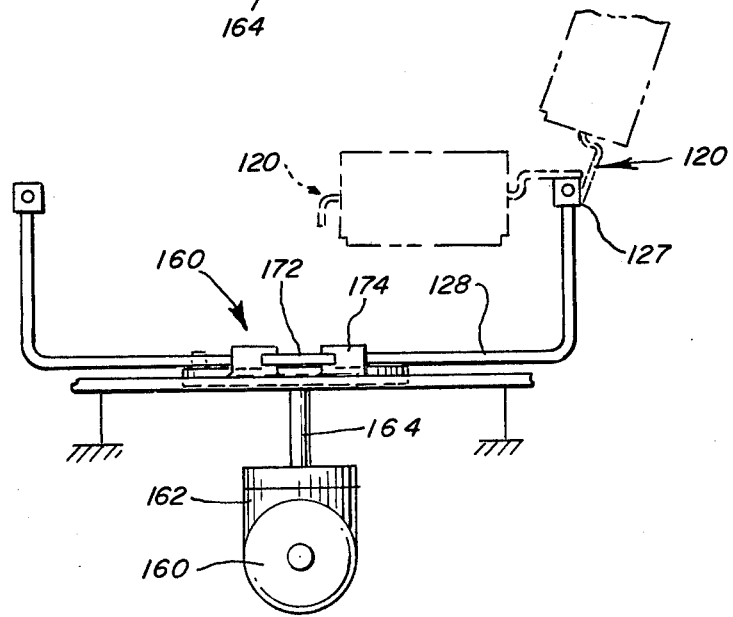
FIG. 9 is a fragmentary front elevational view of the apparatus of FIG. 5 showing a portion of the drive mechanism.

A pair of carriages 120, each having a web 122 and a side flange 123, are pivotally mounted on the frame assembly via a bushing and pivot pin assembly 127 (See FIG. 6). Bushing and pivot pin assembly 127 is secured with a reciprocator plate 128 disposed outboard of the grill surface which in turn is secured to a suitable reciprocating mechanism 160.

Reciprocating mechanism 160 comprises a motor 162, a speed reducer 162 and an output shaft 164. Output shaft 164 mounts a crank 166 which in turn mounts a drive shaft 168. Drive shaft 168 is disposed in a transverse slot 170 in reciprocator plate 128. Reciprocator plate 128 also comprises a longitudinal portion 172 which is mounted for reciprocating movement in laterally disposed bearings 174.

As drive shaft 168 is driven by output shaft 164 and crank 166 it travels in a circular path bearing against the edge of slot 170 causing plate 128 to reciprocate. Of course, as it does so, it causes the connected carriages 120 to reciprocate as well.

Each carriage 120 mounts three egg rings 140 which may be mounted and secured to the carriages generally in the same manner as are carriage 20 and egg rings 40. Egg rings 140 and associated interceptor or comb members may be the same as their respective counterparts 40, 50. Alternatively, a comb member 158 may be notched into the egg ring and may have two rather than three teeth as shown by FIGS. 5 and 6. In this embodiment the egg rings may comprise an inner non-metallic confining ring portion 151, as of polytetrafluoroethylene and an outer metallic mounting member 153 which are suitably supported on the web 122, as by pins 141 and keeper pins 143. The teeth 157 are about ½ inch long and may be adjacent and above the elevation of the ring portion lower surface 155.

Similarly, the operating circuitry for the grill assembly 108, in terms of the power switch and cooking cycle circuitry, may be the same as that of the embodiment of FIG. 1. The cooking cycle and relative movements and duration of the cooking cycle portions may be the same as well.

Of course, as seen, the carriages 120 move laterally to the dotted line egg removal and cleaning position rather than rearwardly as they did in the embodiment of FIG. 1. This has a number of advantages in ease of use and cleaning.

It will be apparent to those skilled in the art that various modifications may be made in the method and apparatus disclosed without departing from the spirit of the invention. For example, ring dimensions may be changed. Partial oscillatory to and fro motion may be used. The durations of the two portions of the cooking cycle may be changed and the length of the stroke may also be changed to suit particular egg mixes and to suit the taste of the user. All of these and other variations and modifications which would occur to those skilled in the art are within the spirit of the invention and are intended to be embraced herein. Accordingly, we intend to be limited only insofar as may be required by the appended claims.

What is claimed is:

1. A method of preparing scrambled eggs comprising the steps of disposing liquid eggs to be scrambled within each of at least two egg rings, each egg ring having a lower edge portion in intimate contact with a heated grill surface, rapidly moving the egg rings to and fro while maintaining said lower edge portions in said intimate contact with said grill surface, thereby to mix and rapidly move the eggs within the confines of said egg rings, and continuing said rapid movement until the eggs in each egg ring have congealed into a mass of cooked scrambled egg.

2. The method of claim 1, wherein said to and fro movement is reciprocating movement.

3. The method of claim 1 wherein each said egg ring mounts an interceptor member, the lower edge of which is adjacent said grill surface, and wherein said interceptor member engages, moves and mixes said eggs as said egg ring moves to and fro.

4. The method of claim 3 wherein said interceptor member is a comb member having downwardly extending teeth, the base of said teeth defining said lower edge.

5. The method of claim 1 wherein each said egg ring is generally rectangular and said movement is at a first rate for a first portion of said rapid movement during which said eggs are primarily liquid, and at a second faster rate for a second portion of said rapid movement during which said eggs are at least partially congealed.

6. The method of claim 5 wherein said to and fro movement is reciprocating movement.

7. The method of claim 1 wherein said to and fro movement produces a wave-like motion of said liquid eggs during a first portion of said rapid movement.

8. The method of claim 7 wherein each said egg ring is generally rectangular and said reciprocating movement is at a first rate for a first portion of said rapid movement during which said eggs are primarily liquid, and at a second faster rate for a second portion of said rapid movement.

9. The method of claim 8 wherein each said egg ring mounts and interceptor member having downwardly extending teeth, the lower edge of said teeth being above said grill surface, and wherein said teeth engage and move and mix said eggs as said egg rings move to and fro.

* * * * *